May 14, 1929.   C. M. EASON   1,713,271
SPECIAL TRUCK
Filed Feb. 15, 1926   8 Sheets-Sheet 1
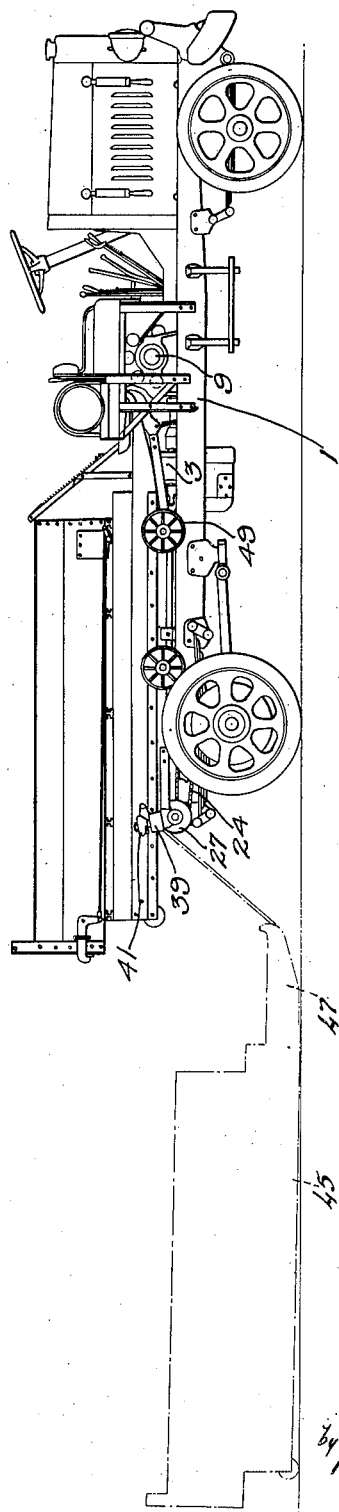

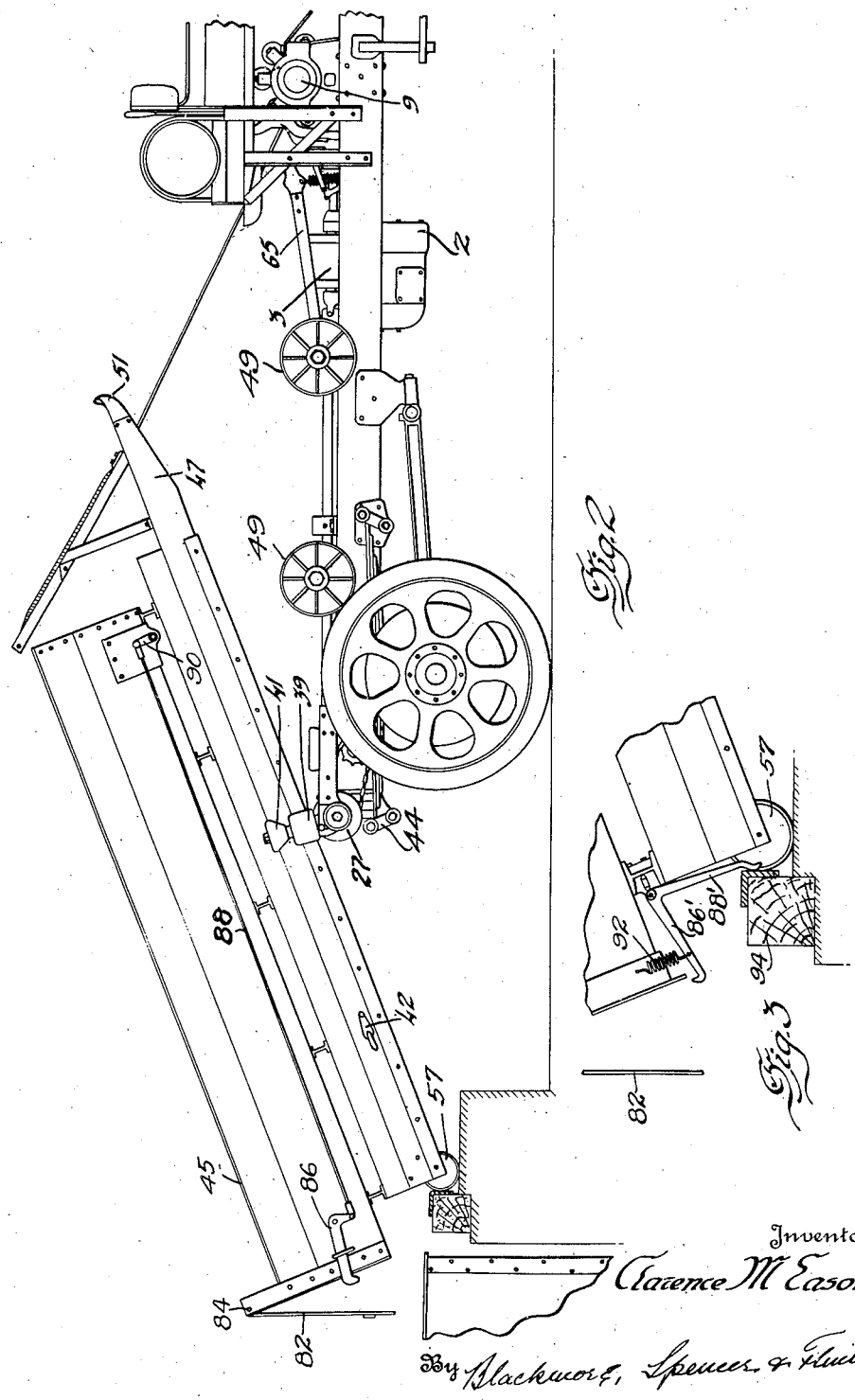

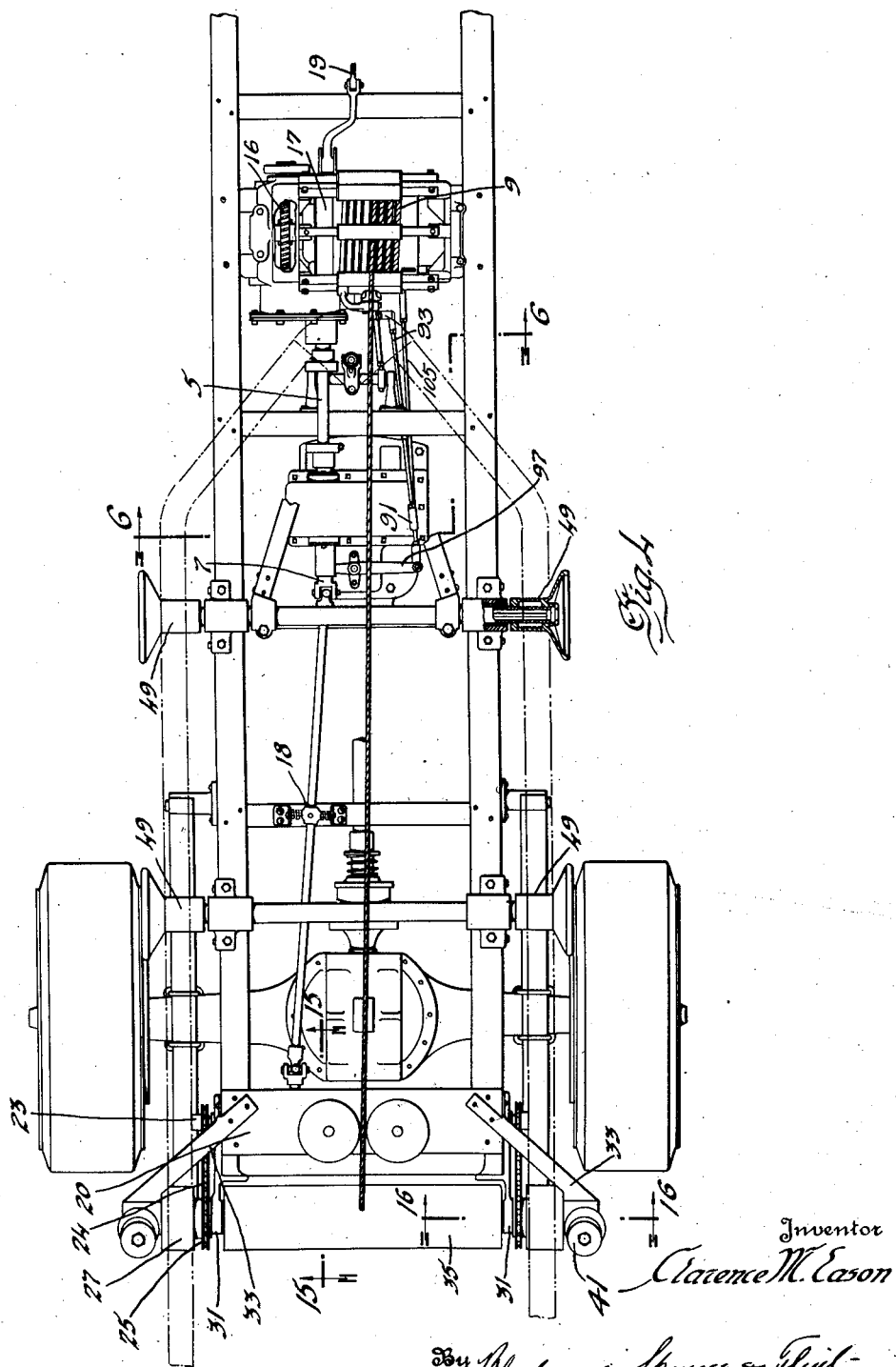

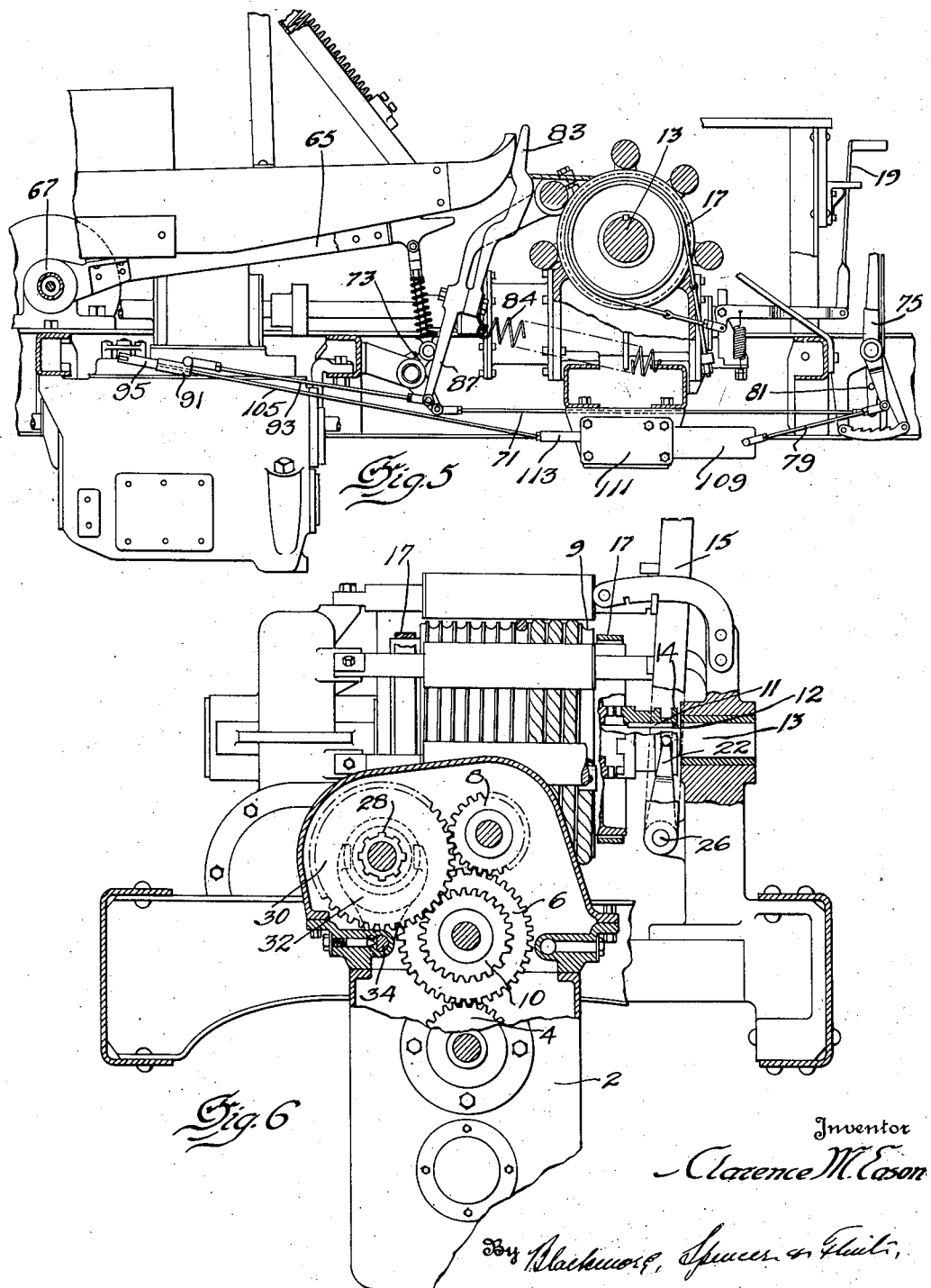

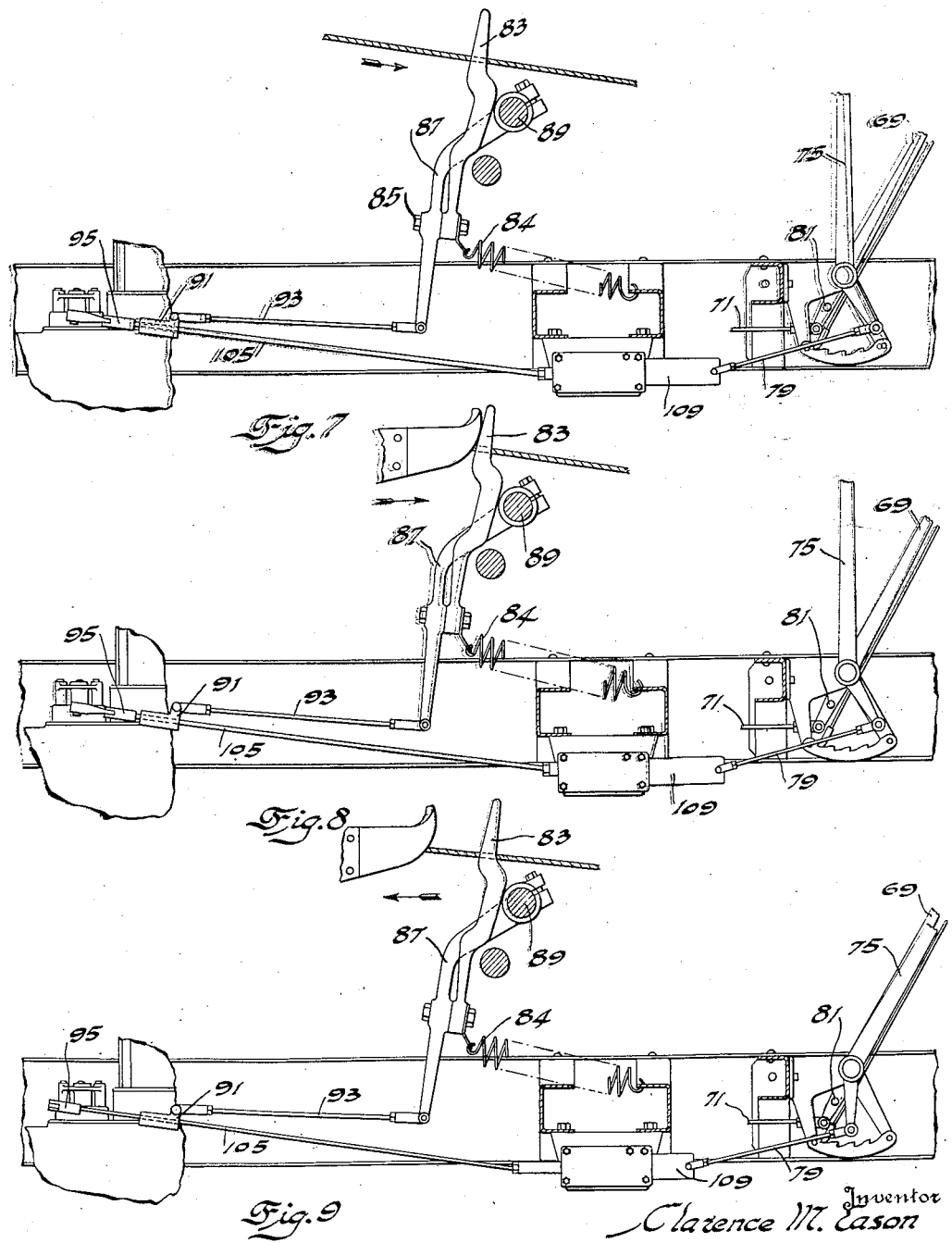

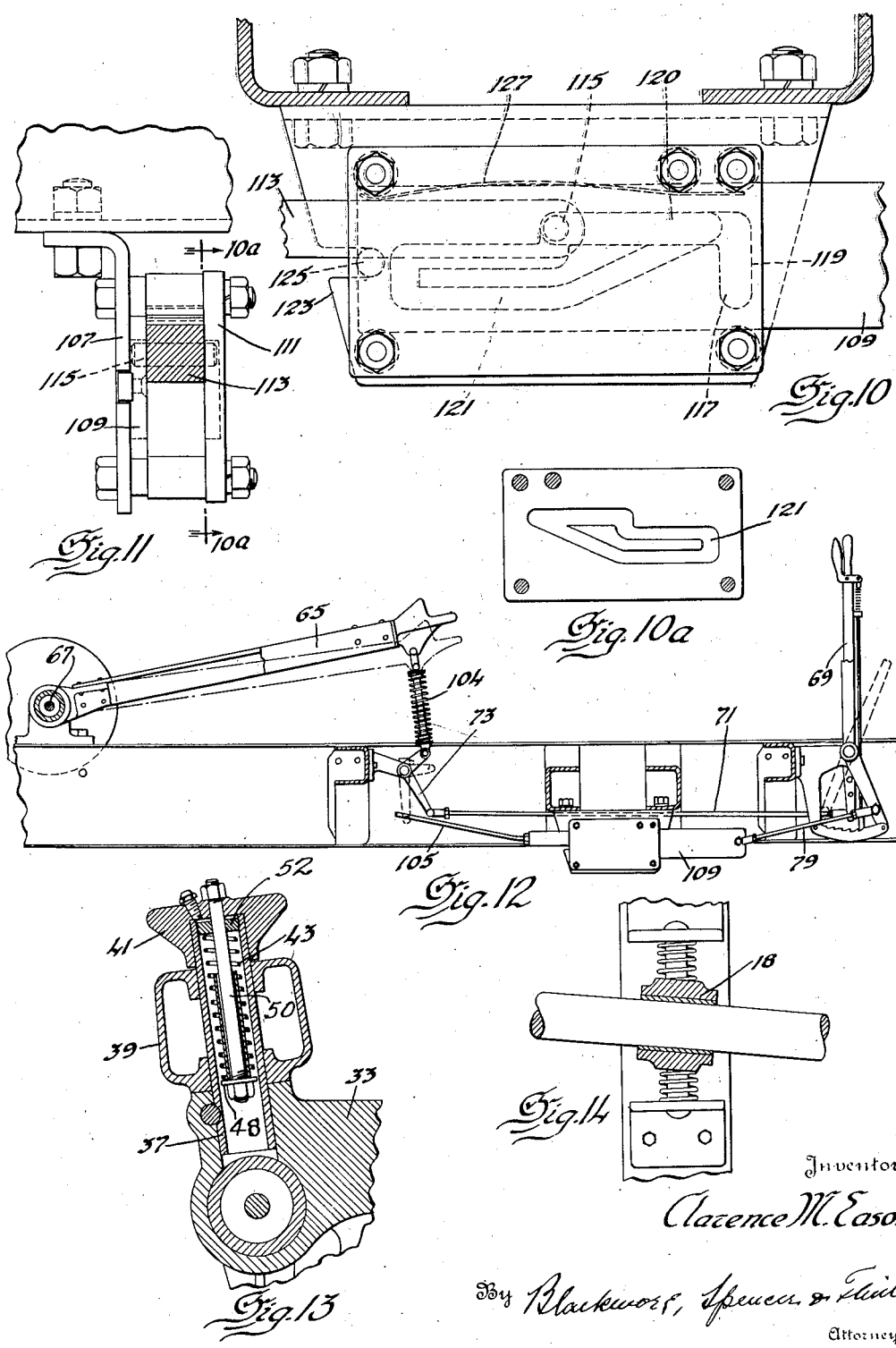

May 14, 1929.  C. M. EASON  1,713,271
SPECIAL TRUCK
Filed Feb. 15, 1926   8 Sheets-Sheet 7

Inventor
Clarence M. Eason
By Blackmore, Spencer & Hulse
Attorneys

May 14, 1929.  C. M. EASON  1,713,271
SPECIAL TRUCK
Filed Feb. 15, 1926    8 Sheets-Sheet 8
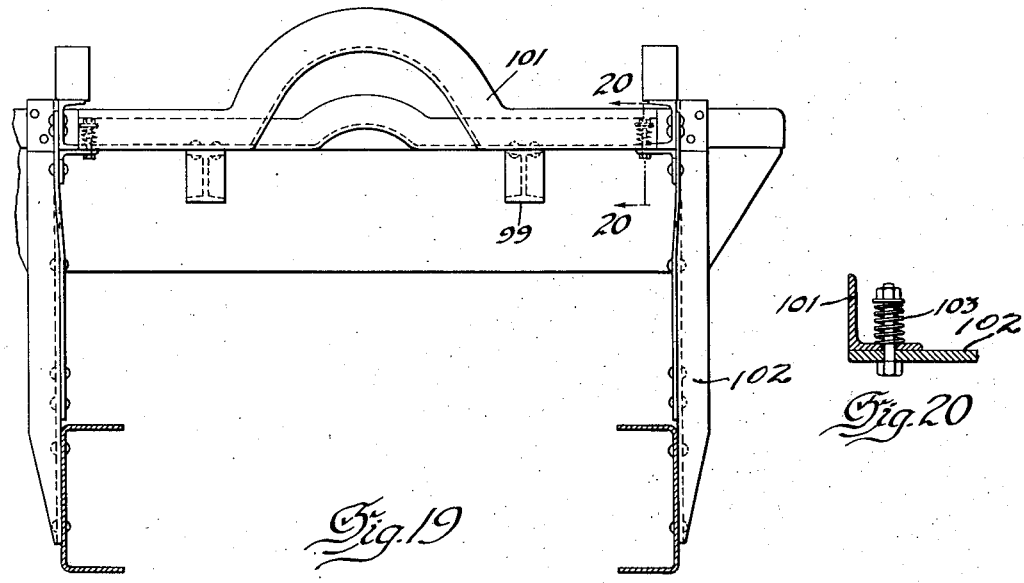
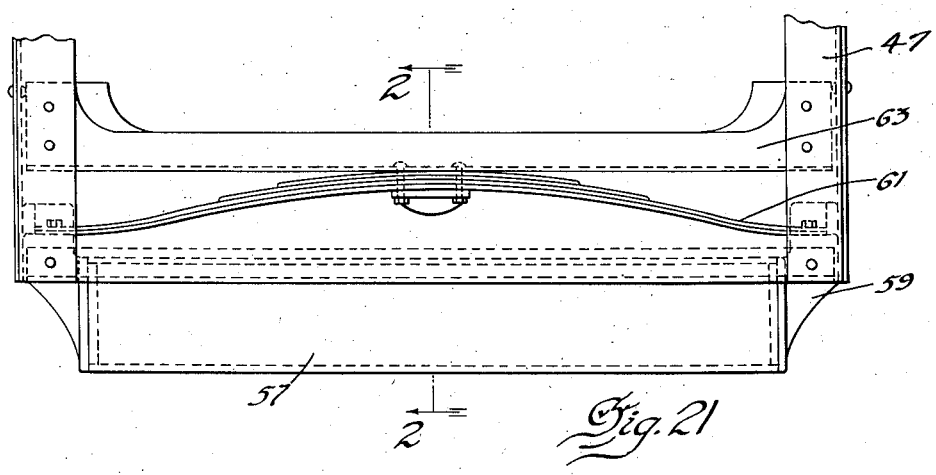
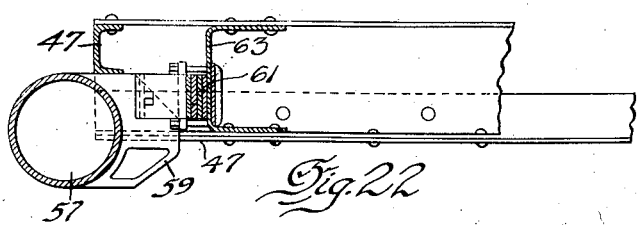
Inventor
Clarence M Eason
By Blackmore, Spencer & Flint
Attorneys Patented May 14, 1929.

1,713,271

UNITED STATES PATENT OFFICE.

CLARENCE M. EASON, OF DETROIT, MICHIGAN, ASSIGNOR TO GENERAL MOTORS CORPORATION, OF DETROIT, MICHIGAN, A CORPORATION OF DELAWARE.

SPECIAL TRUCK.

Application filed February 15, 1926. Serial No. 88,337.

This invention relates to trucks. It is intended primarily for use in the nitrate fields where foreign matter must be removed by hand as the truck bodies are being loaded. It is therefore desirable that the bodies be removable from the truck chassis and loaded while on the ground. This renders, more economical, the sorting of the material and the loading of the truck body. It also releases the truck chassis for handling other loaded bodies during the time that any one body is being loaded.

The object of the invention is to provide a truck body removable from the truck by power from the truck motor. The mechanism is capable of operation also to raise the loaded body from the ground to its normal position on the truck chassis. Among other objects are the provision of mechanism to lock the body on the truck, the last named mechanism so associated with the power take off shift lever that the latter cannot be operated when the body is locked. The invention also contemplates the provision of means to automatically restore the power take off to neutral when the body reaches its forward position on the chassis. An interlock is associated with this automatic means to permit the power take off to reach its neutral position without disturbing the forward position of the power take off shift lever, and to prevent a subsequent incorrect use of the power take off shift lever.

Other objects will be understood from the complete description which follows.

In the drawings, which show what is now considered a preferred embodiment of the invention, Figure 1 is a view of the truck in side elevation, the dotted lines showing the body as it rests on the ground. Figure 2 is a similar view showing the body tilted to a dumping position.

Figure 3 is a side elevation of the rear end of the body in dumping position. This figure shows a modified form of tail board release.

Figure 4 is a plan view of the chassis with the body removed.

Figure 5 is a side view showing the position of parts when the body is drawn forward and locked to the truck.

Figure 6 is a transverse vertical section through the power take off gearing.

Figures 7, 8 and 9 are three views in side elevation of parts operative to control the power take off gear, showing also the means to automatically restore the gearing into neutral.

Figure 10 is a side elevation of the interlock.

Figure 10ª is a side elevation of the outer plate of the interlock looked at from the inside.

Figure 11 is an end view of the interlock.

Figure 12 is a side view of the body locking mechanism.

Figure 13 is a vertical sectional view of one of the guide rollers.

Figure 14 is a plan view of the resilient mounting for one of the power take off shafts.

Figure 15:
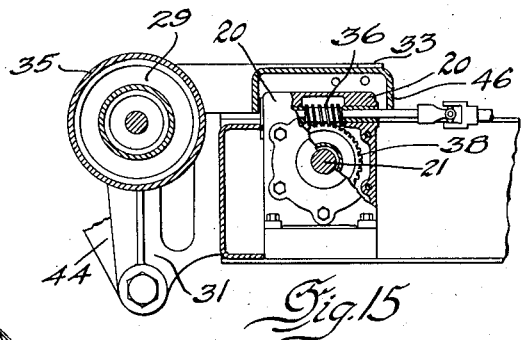

Figure 15 is a view in side elevation, partly in section, of mechanism associated with the driven rollers.

Figure 16:
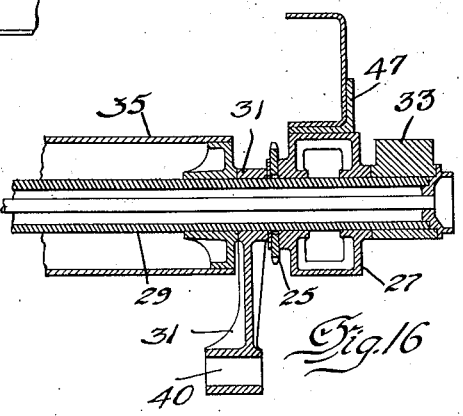

Figure 16 is a section on line 16—16 of Figure 4.

Figure 17:
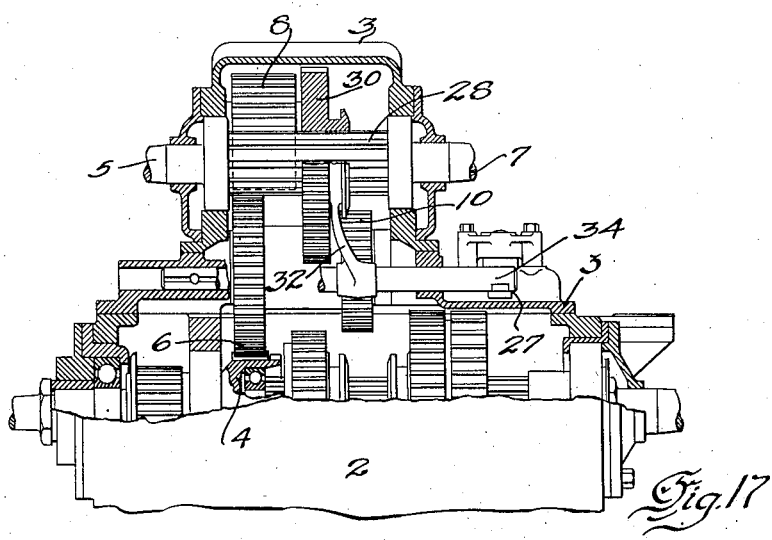

Figure 17 is a longitudinal, vertical section through the take off gearing.

Figure 18:
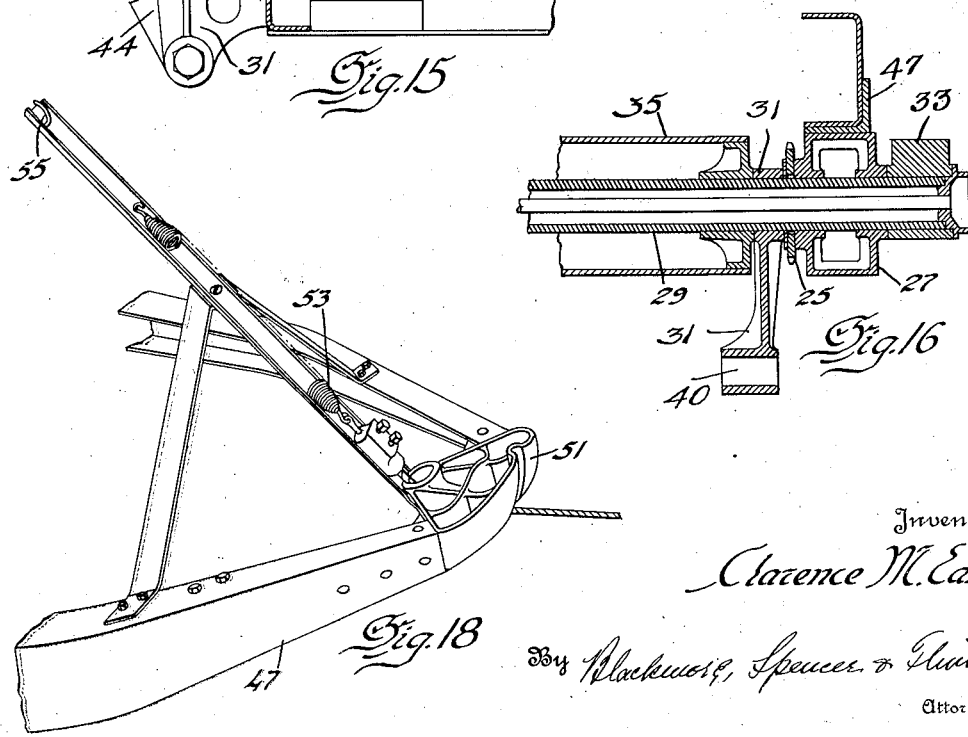

Figure 18 is a perspective of the front end of a body skid.

Figure 19 is a rear elevation of a resilient member to hold down the skid.

Figure 20 is a sectional detail on line 20—20 of Figure 19.

Figure 21 is a plan of the resilient bumper carried by the body.

Figure 22 is a view of the same in vertical section.

Referring by reference characters to the drawings, numeral 1 represents the standard truck chassis. This may be a standard G. M. C. five ton chassis. In making this special truck, the rear end of the frame is cut off and mechanism is added by which the body is manipulated.

Above the standard transmission case is bolted a power take off transmission 3, arranged to drive a forwardly extending shaft 5 and a rearwardly extending shaft 7. The power take off gearing is provided to give a forward, a neutral and reverse position by which the driven shafts may be rotated in either direction or be not driven. The speed of the two driven shafts is obviously the same. The transmission gearing represented at 2 is substantially conventional and is not described in detail inasmuch as it is not a part of this invention. It includes a gear 4 which, when the take off unit 3 is bolted in position, engages a gear 6 rotatably mounted in the said take off unit. This gear 6 is in engagement with an idler gear 8. Gear 10 is rigid with but spaced from gear 6. Shafts 5 and 7 are formed integrally with spline shaft 28 within the take off unit 3, and upon shaft 28 is slidably mounted a gear 30 engageable with either gear 8 or gear 10 to give opposite directions of rotation to the shafts 5 and 7 in a manner which will be obvious. Figure 17 shows the shiftable gear in neutral position. The movements of gear 30 are affected in much the usual way by fork 32 carried by slidable rod 34, the movements of the fork are communicated to the rod in a manner explained later. No invention is being claimed for the power unit per se. Under the driver's seat is a winch 9 mounted rotatably upon shaft 13 and connected by a dog clutch 11 with the shaft 13 driven preferably by irreversible worm gearing 16 from the shaft 5. The dog clutch is controlled by a hand lever 15. Upon the winch-drum is a band brake 17 operated by a member 19 adjacent the driver's seat. The dog clutch, being engaged, makes it possible, because of the irreversible worm gearing by which the winch is driven, to let down the body as slowly as desired, or to hold it in any desired position, the irreversible gearing being capable of holding the body in any position.

The rear shaft 7 is extended through universal joints and a yielding support 18 to a housing 20 within which it is geared by a worm 36 and gear 38 to drive a cross shaft 21 (see Figure 15) upon the ends of which are sprockets 23 as shown by Figure 4. These sprockets 23 drive by means of chains 24, other sprockets 25 on driven rollers 27 rotatable on the ends of the shaft 29 extending transversely of the frame, as shown in Figure 16. The shaft 29 is carried by brackets 31 extending from the rear ends of the frame, these brackets may be extended downwardly and formed with eyes 40 for mounting spring shackles 44. Braces 33 are connected to the ends of shaft 29 and to a transverse channel member 46 secured to the side frame members and positioned above housing 20. Also rotatable on shaft 29 and extending across the frame is elongated roller 35 for engaging at times the nose of the body skid frame 47. It should be noted that the peripheral speed of the driven rollers 27 is the same as that of the cable, so that the action of one is accommodated to that of the other, the cable serving to pull the body upon the chassis and the rollers to withdraw the body from the chassis.

Extending vertically above the rear end of the brace 33 and keyed thereto, is tubular shaft 37 as shown in Figure 13. Rotatable about each shaft 37 is a guide roller 39 and above the roller 39 is a hook engaging knob 41 mounted to slide vertically on the end of shaft 37 and to be resiliently held under the action of a spring 43, spring 43 engages at its lower end an abutment 48 on the rod 50 secured to and extended downwardly from knob 41 through tubular shaft 37. At its upper end the spring engages a plug 52 threaded into the upper end of shaft 37. This member 41 engages a hook 42 mounted on the side of the body skid frame 47, when the truck body is in its normal position on the chassis.

Considering now the truck body 45, it will be seen that it is mounted on skids 47, which travel over driven rollers 27 and over other idle rollers 49, carried by the frame, a plurality of such rollers being used as shown in the drawing, the roller being of any preferred form. At its front end the skid, which carries the body, is formed into a nose 51 under the end of which, and through an opening in which, the cable from the winch passes. A spring 53 may be attached to the end of the cable and to a hook 55 on the skid. This spring is of importance in that it takes up slack in the cable which occurs when the body tilts from the position shown in Figure 2 to its normal position resting on the chassis.

On the rear end of the body skid is a bumper. This bumper is an elongated tubular member 57 having end members 59 slidable along the skid frame. These members engage the ends of a leaf spring 61 centrally secured to a cross member 63. As the end of the body strikes the ground or an abutment, when tilted for dumping, the spring takes the shock and prevents damage to the truck body or truck.

Figure 2 shows a tail board 82 pivoted at 84 to the body 45. A latch 86 engages a cooperating part on the tail board. A suitable link 88 connects the latch with a crank arm 90 connected to a manually operable lever, not shown. As a modified form, Figure 3 shows a similar tail board 82. A latch 86' is held by a spring 92 to normally keep the body closed by the tail board. The latch 86' has an arm 88' positioned to engage an abutment 94 and release the tail board when the body and skid is moved to a position adjacent said abutment. A yielding contact between the body and the abutment is had by the bumper 57.

On the truck there is a skid lock 65 pivoted at 67. An operating lever 69, adjacent the driver's seat, operates by means of the link 71 and a bell crank 73, the skid lock 65 to engage and release the latter from the skid nose. Near lever 69 is a power take off shift lever 75 which is connected by a link 79 and an interlock, to be described later, to the power take off gearing in order to shift the latter to forward, neutral or reverse. Figs. 7, 8 and 9, together with Figure 5, illustrate several steps in the operation. In Figure 7 the body is being lifted from the ground and being drawn up on the truck. The skid lock lever 69 is in the unlocking position. The power take-off shift lever 75 is in "forward" position. The winch is pulling by means of the cable as the arrow shows. There is shown in this figure a power take-off throw out lever 83. This lever may have a lateral pivotal movement on a longitudinal pivot 85 to accommodate the lateral movements of the cable on the winch, the cable passing thru the slotted upper end of lever 83. Because of its connection with lever 87 the latter may swing about pivot 89. At its lower end lever 87 is connected by a link 93 with a sleeve 91 which is slidably mounted on a link 105 which is connected to the power take off gearing mechanism by a yoke 95 and a lever 97. A spring 84 holds the levers 83 and 87 in retracted position as in Figure 7. Lever 97 is pivotally connected to the shift rod 32 as shown in Figure 17.

Figure 8 illustrates a second position. In this figure the nose of the body skid has reached the lever 83. It will be seen that any further forward movement of the skid will swing the lever 83. Turning now to Figure 5 it will be observed that the skid has swung the lever. In so doing link 93 has pushed sleeve 91 against yoke 95 and lever 97 has shifted the power take off gearing into neutral and this without moving the power take off shift lever 75 because of the interlock as will be explained below. To lock the skid on the truck, the operator has pulled back upon lever 69 thus raising the skid lock 65 so that it engages the skid behind the skid nose 51 and locks the skid from reverse motion. In doing so he has moved a pin 81 on lever 69 to a point immediately to the rear of lever 75. This prevents the lever 57 being moved to its position of neutral or reverse, while the skid is locked to the truck.

Figure 9 shows the positions of the parts when the operator is driving the skid with the body rearwardly along the chassis as for dumping or dropping it to the ground. Here the skid has first been unlocked by its lever 69. This moves the pin 81 away from lever 75 so that lever 75 may shift the power take off gearing into reverse. Figure 9 shows the lever 75 to have been so moved. In so moving the rod 105 has been reciprocated through sleeve 91. Spring 84 has swung levers 83 and 87 back from the position of Figure 5 to that of Figure 7.

Two parallel rearwardly extending channel members 99 (see Figure 19) are connected to a centrally arched member 101, spring connected as at 103 to upright members 102 of any suitable form carried by the frame. As the skid approaches its normal position on the chassis, it is resiliently held between the channel members 99 and the skid lock by springs 103 and another spring member 104 located between the bell crank 73 and the skid lock, as best shown in Figure 12. This yielding arrangement holds the nose of the skid yieldingly and is of considerable assistance in the removal of the skid, making it more easy for the driven rollers to function as drivers and not to rotate under the skid when the power take off is placed in reverse.

The structure and function of the interlock remains to be described. As has been stated, a link 79 extends rearwardly from the power take off shift lever 75 to the interlock. Extending forwardly from the power take off mechanism to the interlock, is the link 105. Figures 10, 10ª and 11 illustrate this interlock. Extending downwardly from the frame is a flat plate 107, slidably mounted against this plate is the plate 109. This plate member 109 is connected to the link 79. Parallel with and spaced from plate 107 is a plate 111. Movable in the space between plates 109 and 111 is a bar 113 square in cross section, which bar is connected to link 105. At its end, the bar 113 carries a pin 115, which projects from both lateral faces of the bar 113. This pin enters an L shaped slot 117 of bar 109. The vertical part of this slot is represented by numeral 119 and the horizontal part by numeral 120. The opposite end of the pin enters labyrinth slot 121 in plate 111 shown in Figure 10ª. The plate 107 has a notch cut into its end at 123 to receive a limiting pin 125 carried by plate 109. When the power take off gearing is in forward position, as in Figure 7, the pin 115 will be at the right hand end of the interlock. When the power take off gearing is in reverse pin 115 will be at the left hand end of the interlock. Assuming the pin to be in its reverse position at the left hand end, the vertical slot 119 of bar 109 will also be at the left hand end of the interlock. The pin will be at the lowermost part of the labyrinth slot and the vertical slot due to the action of the flat spring 127 pressing down upon the forward end of the bar 113. A forward movement of bar 109 now draws the pin 115 and the bar 113 forward. In such movement the pin rises vertically in the slot 119 and along the lower run of slot 121 until it reaches its forward position. Up to the time when the skid engages lever 83 and automatically restores the power take off to neutral, the operator has complete control of the power take off gearing by the use of the lever 75. He is thus able to shift the body forwardly or backwardly or to hold it in any position desired. The automatic action of the take off throw out mechanism, described above, draws the pin 115 back from this forward position to the neutral position shown in Figure 10 without disturbing the plate 109 or the shift lever. This will be seen to be possible because of the horizontal portion 120 of the L shaped slot. It will also be seen that in this position, because of the pin 125, the shift lever is unable to restore the power take off gearing to forward without first going through reverse. In order to reach reverse, the shift lever must first be moved so that its vertical slot 119 reaches the mid-position of the interlock and this action can take place only when the skid lock is released. When the vertical slot 119 reaches the mid-position, the pin 115 drops down through the action of spring 127, both in the labyrinth slot 121 and vertical slot 119. Thereafter, further rearward movement of the shift lever moves the pin 115 to the rear end of the interlock when the pin again drops, owing to the shape of the labyrinth passages. The gearing is now in reverse.

With the above description of the truck, the operation may be described. Starting with the skid 47 and body on the ground, the operator backs up the truck to a position near the skid nose 51. With the power take off in neutral and the winch dog clutch 11 released, the cable is manually withdrawn from the winch and connected to the front end of the skid. The power take off shift lever 75 is placed in forward position, the master clutch is engaged, and the winch clutch 11 is operated to lock the winch to the shaft. The action of the winch is then to wind the cable and draw up the body from the ground to the chassis. The skid engages the guide rollers 39 and 49. When the skid nose reaches the throw out lever 87 it operates this lever to throw the power take off mechanism into neutral. This is without effect upon the position of the power take off shift lever 75 due to the presence of the interlock. Moreover, the action in restoring the power take off to neutral cannot be carried further and move it into reverse because the pin 115 strikes the end of the upper channel of the labyrinth slot. The operator then, through his lever 69, actuates the skid lock. This action prevents the power take off lever being moved from its forward position into neutral or reverse.

The body now locked in position by the skid lock, is driven to a position where its load is to be dumped, as into a car. For this purpose the usual truck brakes are locked, the skid lock 65 released and the power take off driven in reverse. This action feeds the cable from the winch and simultaneously rotates the driven rollers 27 and the truck body assumes a position as in Figure 2. The tail board may then be released, either manually, as suggested by Figure 2, or automatically, as is shown in Figure 3. In the act of reversing, it will be understood that the power take off shift lever 75 is first moved sufficiently to bring the vertical slot into the mid position of the interlock. This part of its movement has no effect upon the power take off gearing. The further movement of the lever carries the pin to the left end of the interlock where the gearing is placed in reverse. In returning the body to the truck, the power take off gearing is placed in forward position and the body is drawn up on the truck and locked as before. When the body is to be left on the ground for another load, the action is similar to that described for dumping. When the end of the skid engages the ground, the power take off should at once be placed in neutral, and the winch clutch 11 released. The truck is then driven forward in low out from under the front end of the body. The winch drum brake 17 may be applied as the front end of the body drops from the chassis to the ground. The cable is then disconnected from the skid and may be hooked up to another loaded body.

I claim:

1. A truck chassis, a body movable to and from the truck chassis, power take off gearing to move said body in both directions, a lever for shifting said power take off gearing, a connection between said lever and the power take off gearing including an interlock, an automatic throw-out to restore the gearing to "neutral," the interlock functioning to permit such action without movement of the power take off shift lever.

2. A truck chassis, a body movable to and from the chassis, means for locking the body to the chassis, gearing to move the body to and from its position on the chassis, a shift lever with interlocking connection for operating the gearing, a throw-out lever actuated by the body as it reaches its position on the chassis to restore the gearing to "neutral", the action of the throw-out lever functioning through the interlocking connection to permit such gear shift without movement of the shift lever.

3. A truck chassis, a body movable to and from the chassis, means for locking the body to the chassis, a lever to actuate the lock, power take off gearing to move said body, a shift lever therefor, means associated with said body locking lever when in locking position to prevent the actuation of the shift lever.

4. A truck chassis, a forward and "reverse" power take off gearing, a simultaneously operable cable winch and driving rollers driven thereby, whereby a body may be drawn upon the chassis or rolled off therefrom respectively.

5. A truck chassis, a body movable to and from the chassis, power take off gearing therefor, a simultaneously operable cable winch and rollers driven thereby, whereby the body is moved on and off the truck chassis respectively, a clutch and brake operable upon the winch, the parts being dimensioned so that the peripheral speed of the rollers is the same as that of the cable, whereby the two driven devices may be driven in unison when the body is being drawn upon or rolled from the chassis.

6. A truck chassis, a body member movable on or off said chassis, means engaged by opposite faces of the body member as the member reaches its normal position on the chassis and resilient mechanism operating upon said means to hold said body member yieldingly in position permitting its "reverse" movement from the chassis.

7. For association with a body for movement on a truck chassis, a vertical guide roller for guiding the body in its movements, a spring controlled knob member positioned above the roller and a hook on the body engageable with said knob when the body reaches its normal position.

8. A truck chassis, a body movable along the chassis, means driven by truck motor to move said body, means automatically throwing out said power driven means when the body reaches its normal position, said throwout means comprising a lever rotatable on a transverse axis, and carrying a longitudinal pin, a throw-out lever pivoted on said pin for transverse swinging and engageable with the body to swing with the first mentioned lever about the transverse axis, a connection between the said mechanism and the power take off gearing to restore the latter to "neutral" when the throw-out lever is engaged by the body.

9. The combination as set forth in claim 8, said connection being a lever pivoted to the first mentioned lever, and mounted for independent movement under the actuation of the power take off gearing by other than the automatic means.

10. A truck chassis, a body movable to and from the chassis, a winch on the chassis, carrying a cable for moving the body upon the chassis and accommodating the movement of the body in its reverse direction of movement, independent means to move the body in the reverse direction, gearing operable from the chassis motor to rotate said winch, the gearing including an irreversible worm gear and a clutch, whereby the body may be let down as slowly as desired or held in any intermediate position.

11. A truck chassis, reversible gearing thereon, a manually operable lever for manipulating said gearing to forward, "neutral" and "reverse" position, other means operable to shift said gearing from forward to "neutral" without affecting the position of the lever.

12. A gear operating mechanism comprising a sliding plate with an L shaped slot, a cooperating bar with a transverse pin, and a fixed plate with a labyrinth slot, the pin cooperating with said slots, the shape of the labyrinth slot being such as to cooperate with the horizontal part of the L slot to permit the pin being drawn to an intermediate position without movement of the sliding plate.

13. A power take off gearing, an operating lever, a connection including an interlock therebetween, the interlock comprising a bar having a cross pin, a fixed plate with a labyrinth slot, and a sliding plate having an L shaped slot for connection with the operating lever, the relation of the pin and slots being such as to permit a "neutral" position of the power take off gearing to be obtained without moving the operating lever and the sliding plate, and means associated with the sliding plate whereby it may not thereafter restore the gearing to forward without first going through "reverse".

14. A supporting member, a supported member movable thereon, gearing on the supporting member to move the supported member, a lever, linkage including an interlock to actuate said gearing, means automatically actuated by the movable member to engage said linkage to position said gearing into "neutral", said interlock comprising an association of slots and a pin operable to permit the automatic means to position said gearing in "neutral" from which position the lever can only move the gearing to forward after passing through "reverse".

In testimony whereof I affix my signature.

CLARENCE M. EASON.